Jan. 19, 1954

E. M. KANE 2,666,409

SHOCK INDICATING DEVICE

Filed May 7, 1952

*INVENTOR.*
ERNEST M. KANE
BY
ATTORNEYS

Patented Jan. 19, 1954

2,666,409

UNITED STATES PATENT OFFICE 2,666,409

SHOCK INDICATING DEVICE

Ernest M. Kane, Oxnard, Calif.

Application May 7, 1952, Serial No. 286,591

11 Claims. (Cl. 116—114)

(Granted under Title 35, U. S. Code (1952), sec. 266)

The invention described herein may be manufactured and used by or for the Government of the United States of America for governmental purposes without the payment of any royalties thereon or therefor.

This invention relates to shock indicating devices, and is particularly concerned with devices of this type for attachment to an article or object to be transported to indicate whether the article had been subjected en route to mechanical shocks sufficient to damage its internal parts or contents.

Shock gauges or shock indicators are known. However, prior art devices of this type have not proven entirely satisfactory for various reasons. For example, one commercial instrument measures shocks along only one axis. Moreover, it must be adjusted accurately in order to be correctly read, it must be read with a magnifying glass, it is not sensitive to shocks of short duration and it requires in its construction an element made of spring steel, a scarce and critical material.

One object of this invention is to provide a shock indicating device which indicates shock in different directions or along a plurality of axes.

Another object is to afford a shock indicator capable of responding to shocks of short duration.

Another object is the provision of a simple, sensitive, inexpensive shock indicating device constructed of readily available materials and easily attachable to an object or article to be transported, which device indicates at a glance whether the article to which it is attached has been subjected to any undesirable shocks, or shocks beyond a certain magnitude, and also the probable direction thereof.

Other objects and many of the attendant advantages of this invention will be readily appreciated as the same becomes better understood by reference to the following detailed description when considered in connection with the accompanying drawings wherein.

The shock indicating device of the invention comprises chiefly a shock-sensitive element having a plurality of radial frangible extensions arranged along more than one geometrical axis. The shock-sensitive element includes a central body portion having radial extensions in the form of frangible arms attached thereto and arranged along a plurality of axes. These arms are each provided with a constricted section, which is the most sensitive portion of the arm and hence most susceptible to breakage or fracture when the device is subjected to shock. The shock-sensitive element is at least partially enclosed in a transparent protective shield to prevent breakage and fracture of the arms by causes other than mechanical shock, and the entire assembly is adapted for attachment by means of a suitable fastener to an article to be shipped.

The invention device may be attached to any article which it is desired to transport or move, and is particularly designed to be fixed to an object having fragile contents or to a device having sensitive parts, e. g. rocket motors, electronic devices or component parts of guided missiles, immediately after complete packaging or assembling of the article and prior to shipment. After shipment to its destination or at any intermediate point during shipment, the invention indicator may be inspected to ascertain whether the article has been dropped or otherwise jarred sufficiently to damage it internally. This makes it possible to fix responsibility for any damage which has occurred to the article, and to prevent accidents which may occur if a damaged article, e. g. an electronic device or a component part of a guided missile, were to be used.

Figure 1:
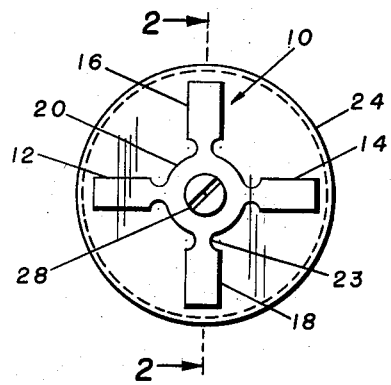
Fig. 1 is a front view of one embodiment of the device.
Figure 2:
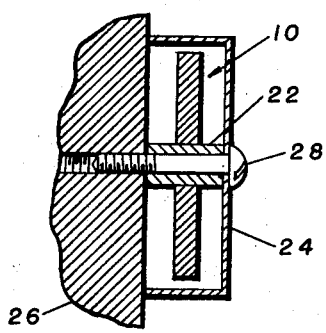
Fig. 2 is a cross-sectional view taken on line 2—2 of Fig. 1.

According to one embodiment of the invention shown in Figs. 1 and 2 of the drawing, shock-sensitive element 10 having four arms 12, 14, 16 and 18 radially extending from a central body portion or hub 20, is rigidly attached, e. g. by cementing, to a central hollow stem 22. Each of the four arms is located in the same plane, the arms being spaced at equal intervals around the hub so that arms 12 and 14 are in line directly opposite each other, and similarly for arms 16 and 18, which are perpendicular to arms 12 and 14. Hence, one pair of arms 12 and 14 may be considered as extending along the X or horizontal axis, and the other pair 16 and 18 along the Y or vertical axis. All of the arms have a constricted section 23 closely adjacent their point of attachment with the hub. It is substantially at these constricted sections that fracture or breakage of the arms takes place, due to shocks to which the device is subjected.

A transparent protective shield 24 encloses the front and sides of the shock-sensitive element 10 and also its associated stem 22, and the entire assembly is then rigidly attached to an article 26 to be transported, by means of a screw 28 passing through the hollow stem 22. The device may be secured to the article with arms 12 and 14 extending along the horizontal axis, and arms 16 and 18 along the vertical axis, as seen in Fig. 1, to determine shocks along these axes. However, if desired, the device of Fig. 1 may be mounted so that the arms are at oblique angles to the horizontal or vertical.

Figure 3:
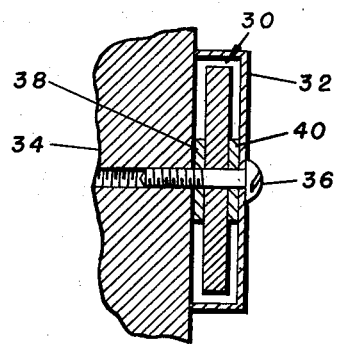
Fig. 3 is a similar cross-sectional view of a modification of the device of Fig. 1.

The shock-sensitive or breakable element and its transparent protective shield may be secured to an article or object in various ways other than that shown in Fig. 2. For example, as seen in Fig. 3, a shock-sensitive element 30 and its protective shield 32 are attached to the object 34 by means of screw 36, employing a washer 38 between the surface of the object and element 30, and a second washer 40 between the protective shield 32 and element 30, to maintain the element and shield 32 rigidly against the object. Such washers are utilized in place of stem 22 of the device of Fig. 2. Moreover, in certain instances, if desired, the invention device may be secured to an article in a cavity or on an irregular surface thereof.

The radial extensions or arms of the invention device may be constructed of any suitable easily fractured material, preferably of a brittle nature, such as glass, porcelain or certain plaster compositions. Any number of radially extending arms may be attached to the center body portion or hub of the shock-sensitive element of the invention device, and these arms may be positioned along any desired axis and in one or more planes. Thus, the embodiment shown in Figs. 4 and 5 of the drawing comprises three arms 42, 44 and 46 equally spaced about hub 48 of the shock-sensitive element 50, arm 42 being in one plane and arms 44 and 46 being in another plane. These arms extend along three different axes diverging from hub 48. This assembly is contained in protective shield 52.

Figure 4:
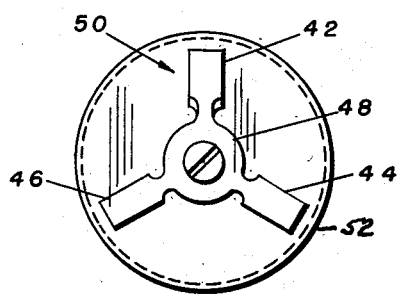
Fig. 4 is a front view of another embodiment of the invention device.
Figure 5:
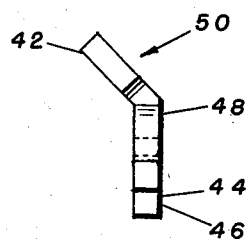
Fig. 5 is a side view of the embodiment of Fig. 4.

When the thickness of the radially extending arms and their respective constricted sections are substantially the same, as shown in Figs. 1 and 4 of the drawing, the shock rating of the device (magnitude of shock at which fracture occurs) is uniform along the different axes. Such shock ratings may be made to vary for different axes, if desired, by varying the thickness or dimensions of the arms and/or their respective constructions.

In employing the shock indicator of the invention, the manufacturer of an article or object to be shipped mounts the indicator on the article by means of a bolt, cap screw, wood screw or other suitable fastening means. The shock indicating device remains attached until the article reaches its destination, or if it is to be used at a number of different locations, the indicator may remain permanently attached. To read the indicator, it is necessary only to inspect it and observe whether any of the arms have been fractured or broken.

From the foregoing, it is seen that the invention device constitutes a simply constructed, inexpensive shock indicator readily assembled and attached to an article to be shipped, and which instantly indicates whether the article has been mishandled or otherwise subjected to unusual shocks during shipment, and if so, the direction thereof, so that the particular parts or contents of the article which may have been damaged may be readily located and replaced or repaired.

Obviously many modifications and variations of the present invention are possible in the light of the above teachings. It is therefore to be understood that within the scope of the appended claims the invention may be practiced otherwise then as specifically described.

I claim:

1. A shock indicating device comprising a shock-sensitive element having a plurality of radial frangible extensions arranged along more than one geometrical axis.

2. A shock indicating device comprising a shock-sensitive element including a central body portion having a plurality of radially extending frangible arms arranged along a plurality of axes.

3. A shock indicating device comprising a shock-sensitive element including a central body portion having a plurality of radially extending arms arranged along a plurality of axes, each of said arms having a constricted frangible section.

4. A device as defined in claim 3 wherein the thickness of at least one of said sections is different from the remaining sections.

5. A device as defined in claim 3 wherein said body portion has four said arms in the same plane, each of said arms being spaced substantially at equal intervals around said body portion.

6. A shock indicating device comprising a shock-sensitive element including a central hub having a plurality of radially extending arms, each of said arms having a constricted frangible section, and a transparent protective shield at least partially enclosing said element, said device being adapted for attachment to an article to be transported.

7. A shock indicating device comprising a shock-sensitive element including a hub having a plurality of radially extending arms arranged along a plurality of axes, each of said arms having a constricted frangible section closely adjacent said hub, a hollow stem fixed to said hub, and a transparent protective shield enclosing the front and sides of said element, said device being adapted for attachment at its back and by means of said stem to an article to be transported.

8. A device as defined in claim 7 wherein said hub has four said arms in the same plane, each of said arms being spaced at substantially equal intervals around said hub.

9. A shock indicating device comprising a shock-sensitive element including a hub having a plurality of radially extending arms arranged along a plurality of axes, each of said arms having a constricted frangible section closely adjacent said hub, a fastener passing through said hollow stem, and a transparent protective shield enclosing the front and sides of said element, said device being adapted for attachment at its back and by means of said fastener to an article to be transported.

10. In combination with an article to be transported, a shock indicating device comprising a shock-sensitive element including a central body portion having a plurality of radially extending arms arranged along a plurality of axes, each of said arms having a constricted frangible section, and a transparent protective shield at least partially enclosing said element, said device being attached to said article.

11. In combination with an article to be transported, a shock indicating device comprising a shock-sensitive element including a hub having a plurality of radially extending arms arranged along a plurality of axes, each of said arms having a constricted frangible section closely adjacent said hub, a hollow stem fixed to said hub, and a transparent protective shield enclosing the front and sides of said element, said device being attached at its back to said article by means of a fastener passing through said hollow stem.

ERNEST M. KANE.

References Cited in the file of this patent

UNITED STATES PATENTS

| Number | Name | Date |
| --- | --- | --- |
| 1,255,919 | O'Connor | Feb. 12, 1918 |
| 2,601,440 | Kerrigan | Jan. 24, 1952 |